United States Patent
Malecha

(10) Patent No.: US 11,208,212 B2
(45) Date of Patent: Dec. 28, 2021

(54) CONTOURED ARMCAP FOR MULTI-SEAT OCCUPANT USAGE

(71) Applicant: B/E Aerospace, Inc., Winston-Salem, NC (US)

(72) Inventor: Jeremy F. Malecha, Pfafftown, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 269 days.

(21) Appl. No.: 16/666,079

(22) Filed: Oct. 28, 2019

(65) Prior Publication Data
US 2021/0323680 A1    Oct. 21, 2021

(51) Int. Cl.
B64D 11/06    (2006.01)

(52) U.S. Cl.
CPC .................. B64D 11/0646 (2014.12)

(58) Field of Classification Search
CPC .... B60N 2/75; B64D 11/0646; B64D 11/0644
See application file for complete search history.

(56) References Cited

U.S. PATENT DOCUMENTS

| | | | | |
|---|---|---|---|---|
| 1,500,524 | A | * | 7/1924 | Phillips ................. A47C 7/543 297/411.34 |
| 2,541,756 | A | * | 2/1951 | Goodman ............... A47C 7/54 297/232 |
| 5,350,217 | A | | 9/1994 | Kanigowski |
| 8,167,348 | B2 | | 5/2012 | Fesenmyer |
| 9,630,720 | B2 | | 4/2017 | Saint-Jalmes |
| 2010/0252680 | A1 | | 10/2010 | Porter |
| 2016/0088947 | A1 | * | 3/2016 | McMillan ................ A47C 7/54 297/411.46 |

FOREIGN PATENT DOCUMENTS

| | | | |
|---|---|---|---|
| JP | H1075847 A | 3/1998 | |
| JP | 2017043229 A | 3/2017 | |
| WO | 2010144420 A1 | 12/2010 | |
| WO | WO-2021080628 A1 * | 4/2021 | ............... B60N 2/75 |

OTHER PUBLICATIONS

Search Report for European Application No. 20204410.3 dated Mar. 9, 2021, 8 pages.

* cited by examiner

*Primary Examiner* — Richard G Davis
(74) *Attorney, Agent, or Firm* — Suiter Swantz pc llo

(57) ABSTRACT

A contoured armcap for multi-seat occupant usage may include a top surface and a raised surface. The raised surface may be configured to separate the top surface into two areas. The raised surface may be offset from the top surface at a select height. The raised surface may be continuously coupled to the top surface via a set of sides. At least one side of the set of sides may be defined by a contour line. The two areas may include a first area configured to support a portion of an arm of a first seat occupant in a first aircraft seat coupled to a shared armrest including the contoured armcap. The two areas may include a second area configured to support a portion of an arm of a second seat occupant in a second aircraft seat coupled to the shared armrest including the contoured armcap.

14 Claims, 16 Drawing Sheets

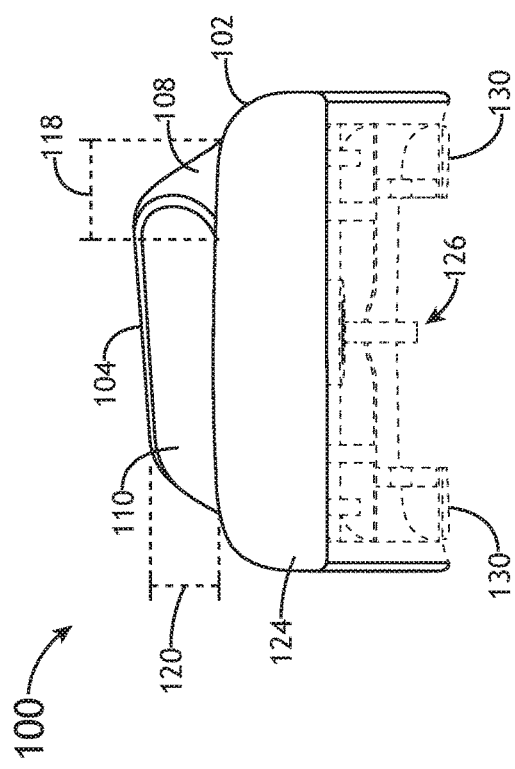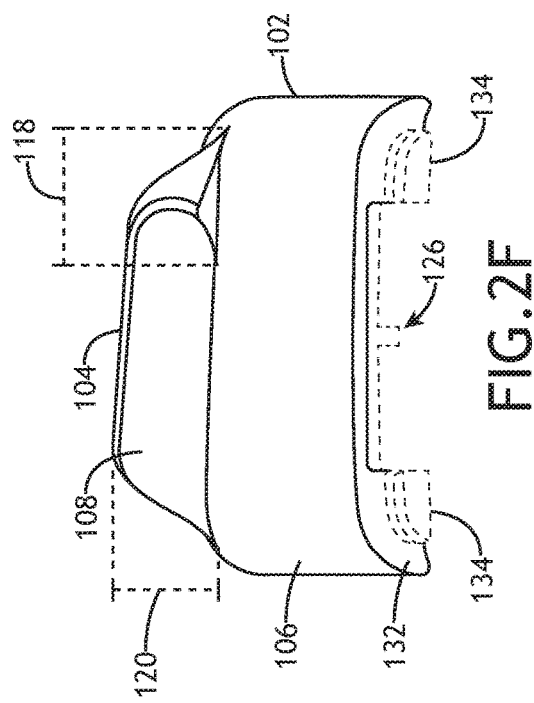

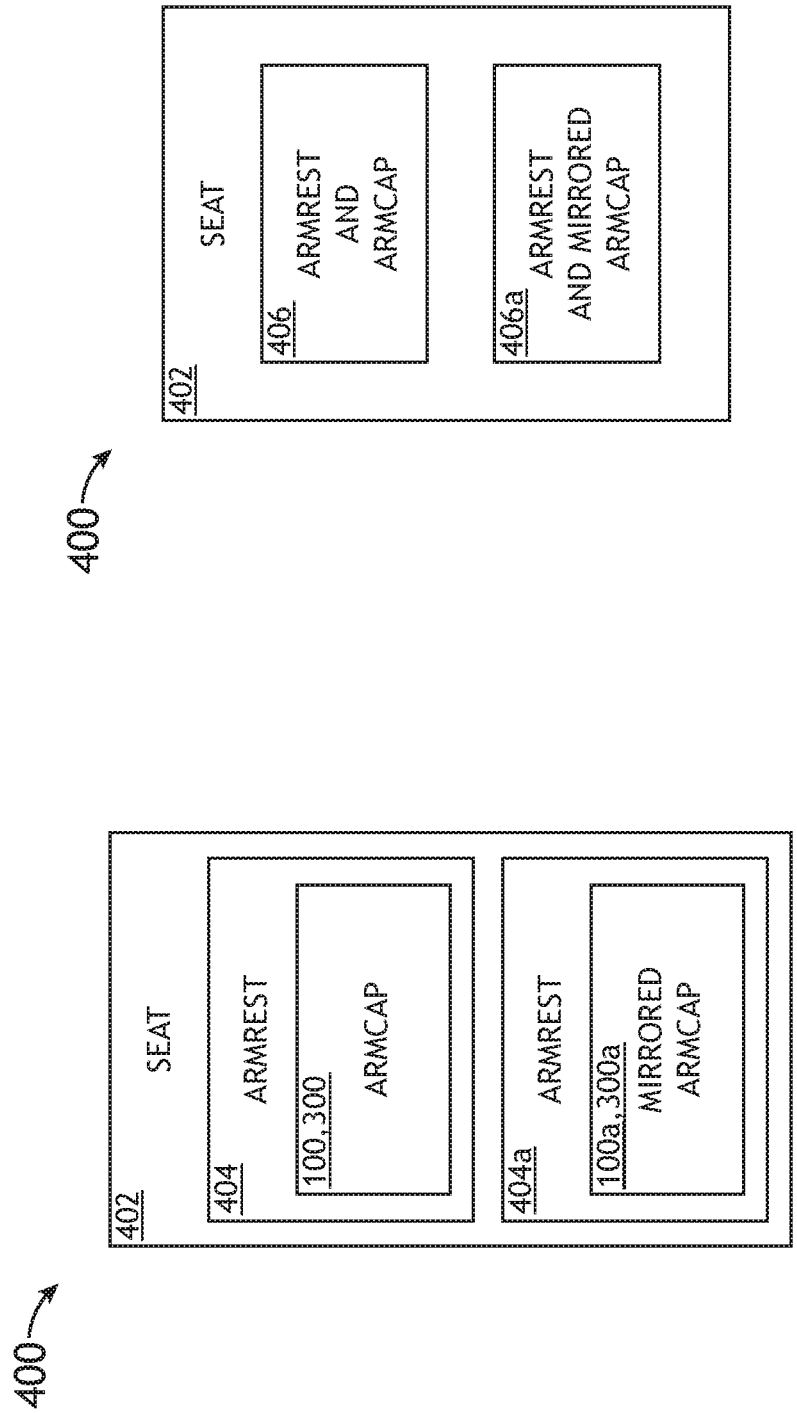

CONTOURED ARMCAP FOR MULTI-SEAT OCCUPANT USAGE

BACKGROUND

In commercial transportation vehicles such as aircraft, buses, or the like, adjacent seats may be configured to require occupants to come to a compromise regarding the use of a shared armrest positioned between the adjacent seats. As it may be difficult to determine which occupant gets which part of the shared armrest, the situation often results in the compromise of one individual using the shared armrest in its entirety. In the case of a triple seat, an occupant in a middle seat may be required to come to a compromise with both adjacent occupants of the respective shared armrests.

SUMMARY

A contoured armcap for multi-seat occupant usage is disclosed, in accordance with one or more embodiments of the disclosure. The contoured armcap may include a top surface. The contoured armcap may include a raised surface configured to separate the top surface into two areas. The raised surface may be offset from the top surface at a select height. The raised surface may be continuously coupled to the top surface via a set of sides. At least one side of the set of sides may be defined by a contour line. The two areas may include a first area configured to support a portion of an arm of a first seat occupant in a first aircraft seat coupled to a shared armrest including the contoured arm cap. The two areas may include a second area configured to support a portion of an arm of a second seat occupant in a second aircraft seat coupled to the shared armrest including the contoured armcap.

In some embodiments, the contour line may be an S-curve.

In some embodiments, the contour line may be a diagonal line.

In some embodiments, the select height may vary along a length of the contoured armcap.

In some embodiments, the select height may have a peak in a central portion of the raised surface.

In some embodiments, the raised surface may be offset from the two areas at the select height.

In some embodiments, the raised surface may be an area of the two areas. The raised surface may be configured to support a portion of an arm of a particular seat occupant.

In some embodiments, the contoured armcap may further include a bottom surface with one or more dimensions configured to conform to a surface of the shared armrest. The contoured armcap may further include one or more side surfaces. The one or more side surfaces may be configured to connect the top surface and the bottom surface.

In some embodiments, the bottom surface may include one or more bottom couplers. The contoured armcap may be configured to couple to the shared armrest via the one or more bottom couplers.

In some embodiments, the second aircraft seat may be coupled to the shared armrest and a second shared armrest. The second shared armrest may include a second contoured armcap with a second raised surface mirrored through a plane defined by a side surface of the one or more side surfaces.

In some embodiments, the contoured armcap may further include a rear surface with one or more dimensions configured to conform to a surface of the shared armrest. The rear surface may be configured to connect the top surface and the bottom surface.

In some embodiments, the rear surface may include one or more rear couplers. The contoured armcap may be configured to couple to the shared armrest via the one or more rear couplers.

In some embodiments, the contoured armcap and the shared armrest may be fabricated as a single component.

A contoured armcap for multi-seat occupant usage is disclosed, in accordance with one or more embodiments of the present disclosure. The contoured armcap may include a top surface. The contoured armcap may include a divider configured to separate the top surface into two areas. The divider may be offset from the top surface at a select height. The divider may be continuously coupled to the top surface via a set of sides. At least one side of the set of sides may be defined by a contour line. The two areas may include a first area configured to support a portion of an arm of a first seat occupant in a first aircraft seat coupled to a shared armrest including the contoured armcap. The two areas may include a second area configured to support a portion of an arm of a second seat occupant in a second aircraft seat coupled to the shared armrest including the contoured arm cap.

In some embodiments, the divider may include a raised surface.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2E is a front elevation view of a contoured armcap for multi-seat occupant usage, in accordance with one or more embodiments of the disclosure;

FIG. 2F is a rear elevation view of a contoured armcap for multi-seat occupant usage, in accordance with one or more embodiments of the disclosure;

FIG. 4A is a block diagram illustrating a vehicle including a seat with contoured armcaps for multi-seat occupant usage, in accordance with one or more embodiments of the disclosure; and FIG. 4B is a block diagram illustrating a vehicle including a seat with contoured armcaps for multi-seat occupant usage, in accordance with one or more embodiments of the disclosure.

DETAILED DESCRIPTION OF THE INVENTION

Figure 1A:
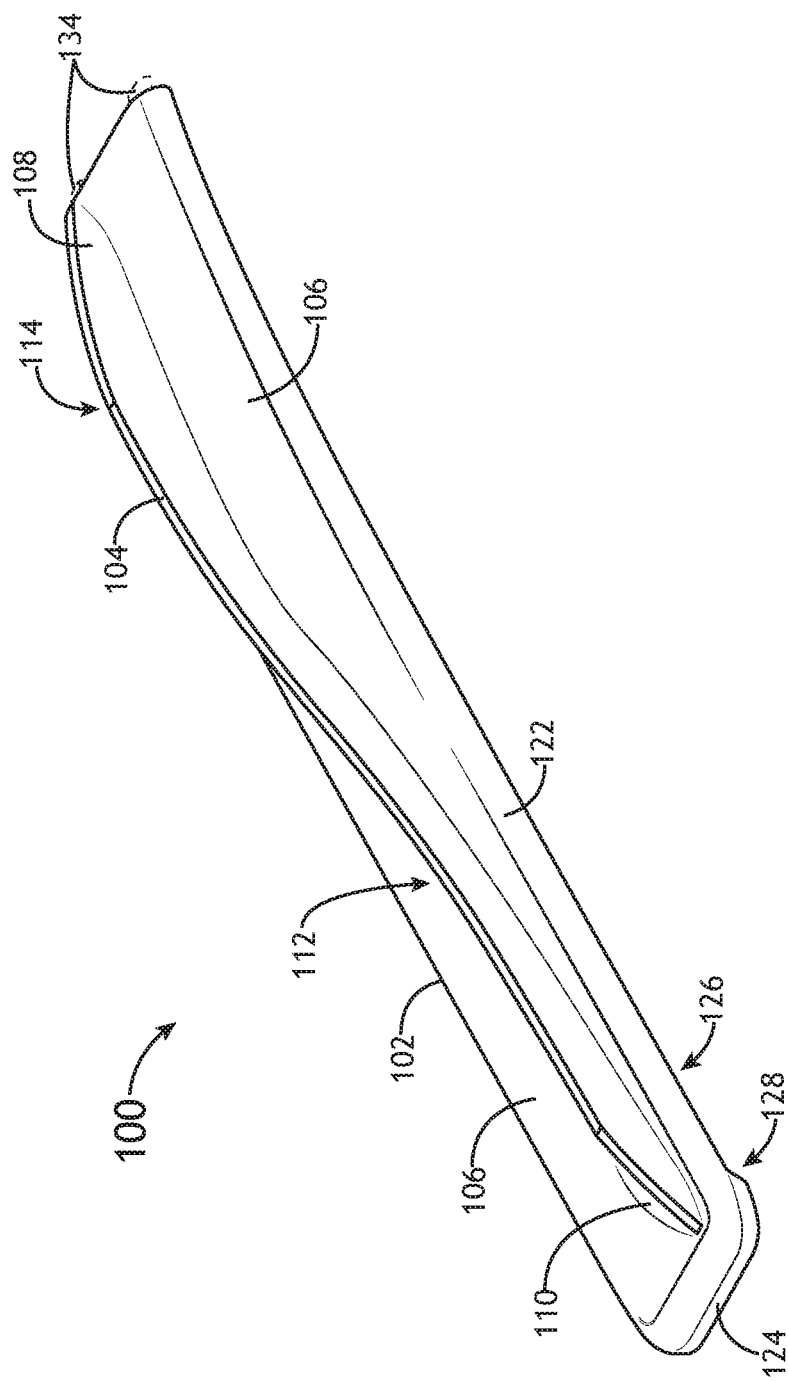
FIG. 1A is a perspective view of a contoured armcap for multi-seat occupant usage, in accordance with one or more embodiments of the disclosure.
Figure 1B:
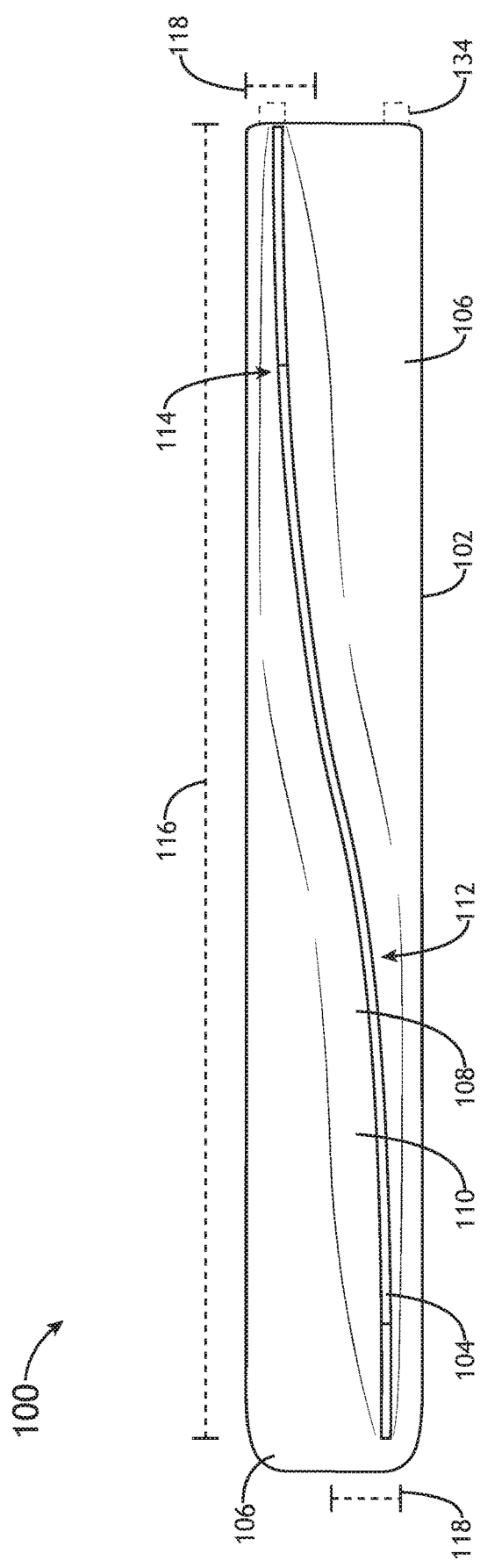
FIG. 1B is a top plan view of a contoured armcap for multi-seat occupant usage, in accordance with one or more embodiments of the disclosure.
Figure 1C:
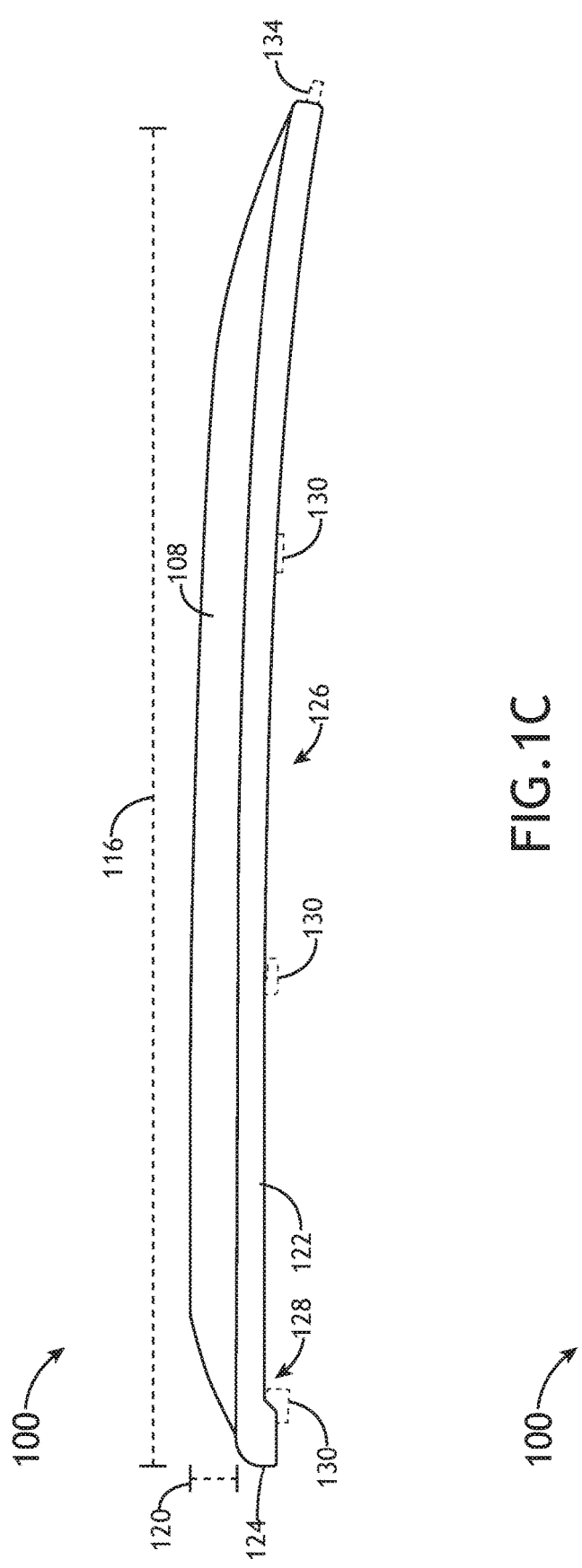
FIG. 1C is a left elevation view of a contoured armcap for multi-seat occupant usage, in accordance with one or more embodiments of the disclosure.
Figure 1D:
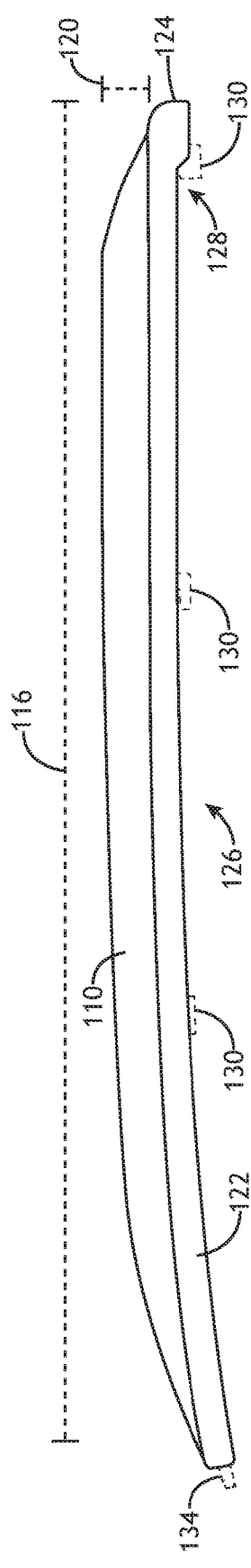
FIG. 1D is a right elevation view of a contoured armcap for multi-seat occupant usage, in accordance with one or more embodiments of the disclosure.
Figure 1E:
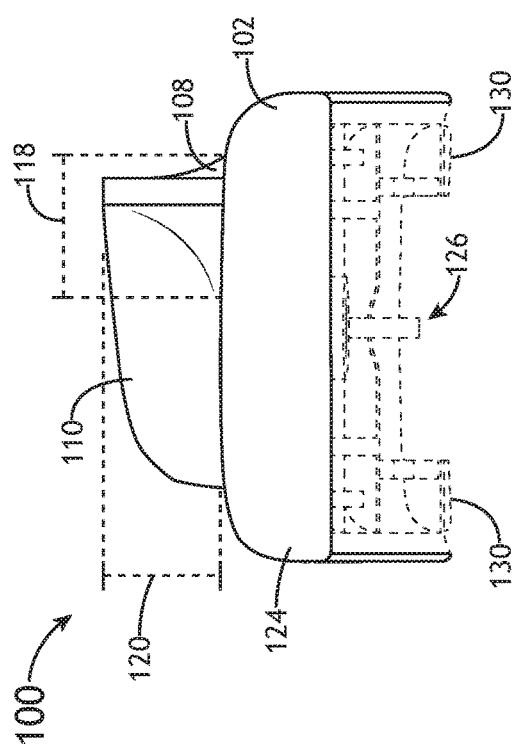
FIG. 1E is a front elevation view of a contoured armcap for multi-seat occupant usage, in accordance with one or more embodiments of the disclosure.
Figure 1F:
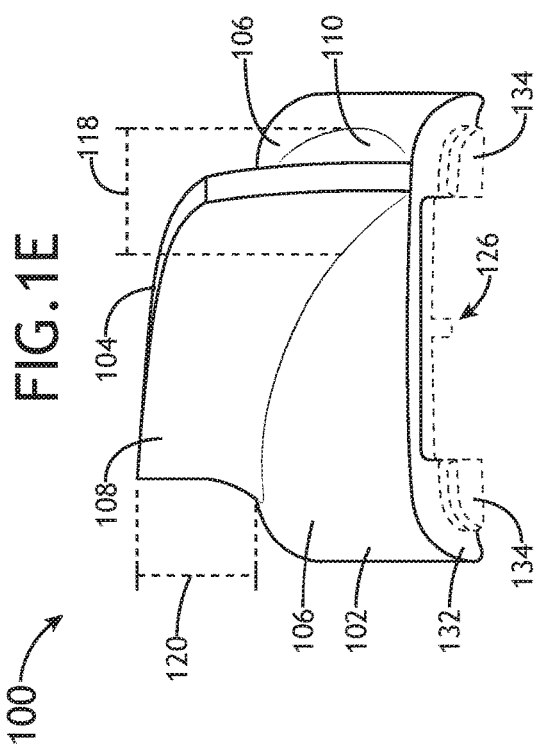
FIG. 1F is a rear elevation view of a contoured armcap for multi-seat occupant usage, in accordance with one or more embodiments of the disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1 b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-4B generally illustrate a contoured armcap for multi-seat occupant usage, in accordance with one or more embodiments of the disclosure.

Divided armcaps known in the art are not intuitive in terms of which portion of the armcap a particular seat occupant may use. In addition, the divided armcaps known in the art may take up seat occupant space and/or may require a seat occupant to hold arms in an uncomfortable position. Further, the divided armcaps known in the art may be too complex to make and/or may require a re-design of the seat and/or the armrest attached to the seat.

As such, it would be beneficial to provide a contoured armcap for multi-seat occupant usage which includes a sculpted surface that intuitively provides seat occupants sharing the armrest a natural compromise. In addition, it would be beneficial to provide a contoured armcap with a design that minimizes a reduction of seat occupant space and that fits existing armrests.

FIGS. 1A-1G and 2A-2G generally illustrate a contoured armcap 100 for multi-seat occupant usage, in accordance with one or more embodiments of the disclosure.

The armcap 100 may include a rigid or flexible body. The body may be fabricated as a single piece. For example, the body may not include multiple components that are coupled together via clips, hinges, or other coupling or interlocking assemblies.

The armcap 100 may include a top surface 102. The top surface 102 may include a divider configured to indicate to seat occupants occupying adjacent aircraft seats coupled to a shared armrest (e.g., an armrest 404, as illustrated in FIG. 4) which portion of the armcap 100 each seat occupant may use.

The divider may include a raised edge or surface 104. For example, the raised edge or surface 104 may be considered a surface where it has a non-nominal width. The raised edge or surface 104 may separate the top surface 102 into two areas 106. Each area 106 may be configured to support a portion of a forearm of a seat occupant using the armcap 100.

The raised edge or surface 104 may be continuously coupled to the top surface 102 via a set of one or more sides. For example, the armcap 100 may have a side 108 and a side 110 coupling the raised edge or surface 104 with the top surface 102. As illustrated in FIGS. 1A-1G, the side 108 and/or the side 110 may include a concave fillet section that may conform with a portion of a forearm of a seat occupant using the armcap 100. As illustrated in FIGS. 2A-2G, the side 108 and/or the side 110 may be defined by a mitre fillet. It is noted herein the side 108 and/or the side 110 may include a convex fillet. In addition, it is noted herein the side 108 and/or the side 110 may include any combination of concave fillets, mitre fillets, and/or convex fillets. It is noted herein that "continuously" is being used to indicate there is no empty space or gap between the top surface 102 and the raised edge or surface 104 (e.g., a gap in which a seat occupant may insert a portion of their body including a finger or thumb, wrist, arm, or the like).

Figure 1G:
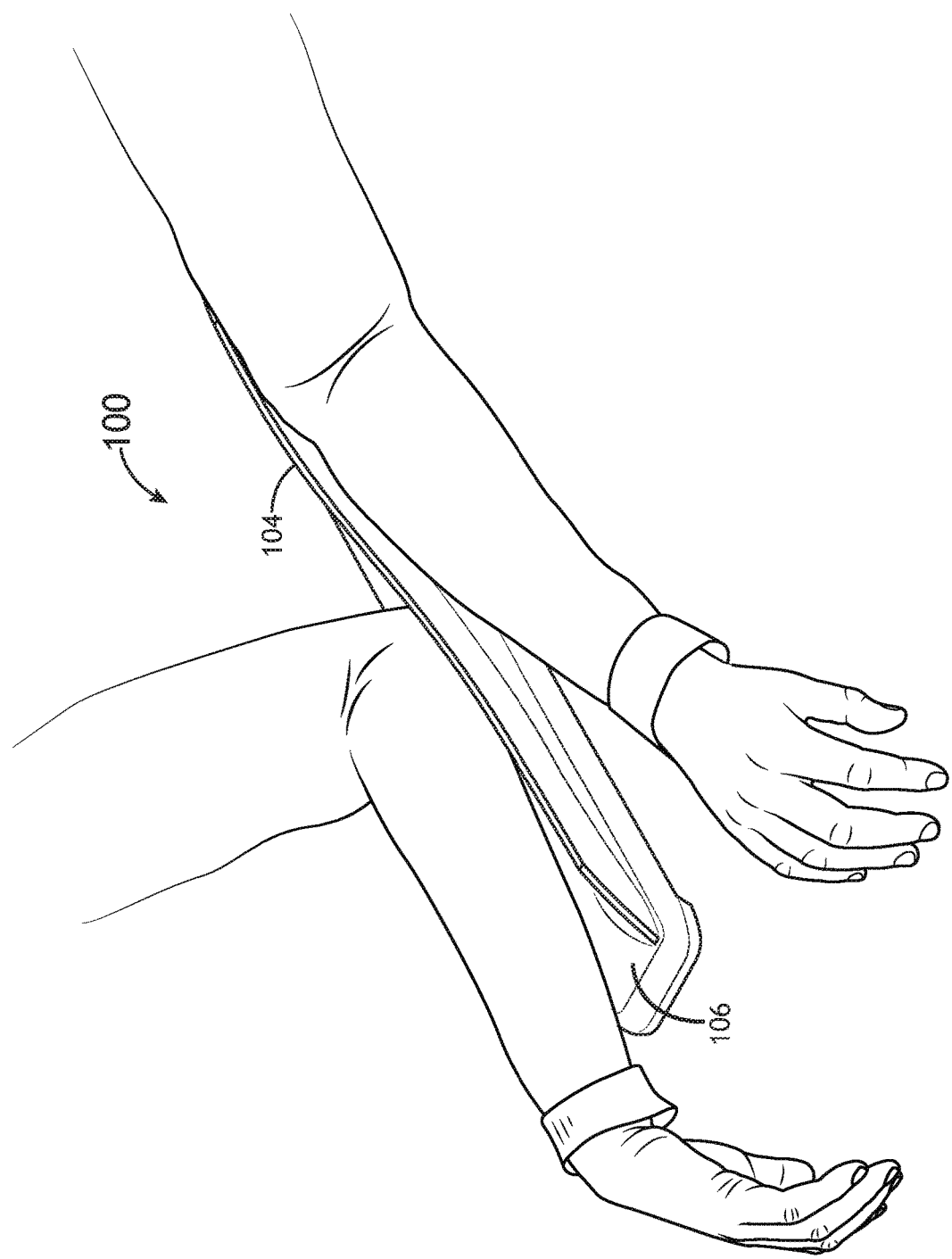
FIG. 1G is a perspective view of a contoured armcap for multi-seat occupant usage in use, in accordance with one or more embodiments of the disclosure.
Figure 2A:
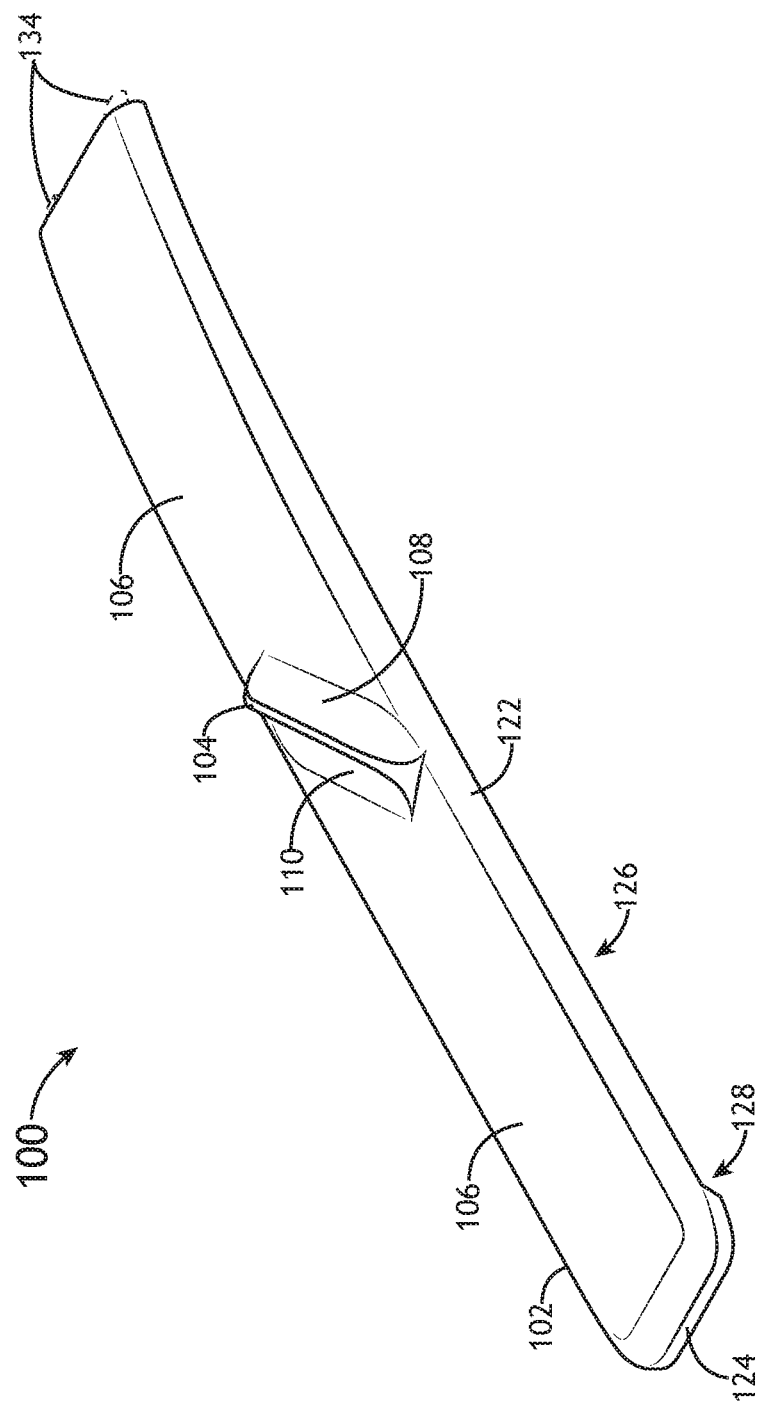
FIG. 2A is a perspective view of a contoured armcap for multi-seat occupant usage, in accordance with one or more embodiments of the disclosure.
Figure 2B:
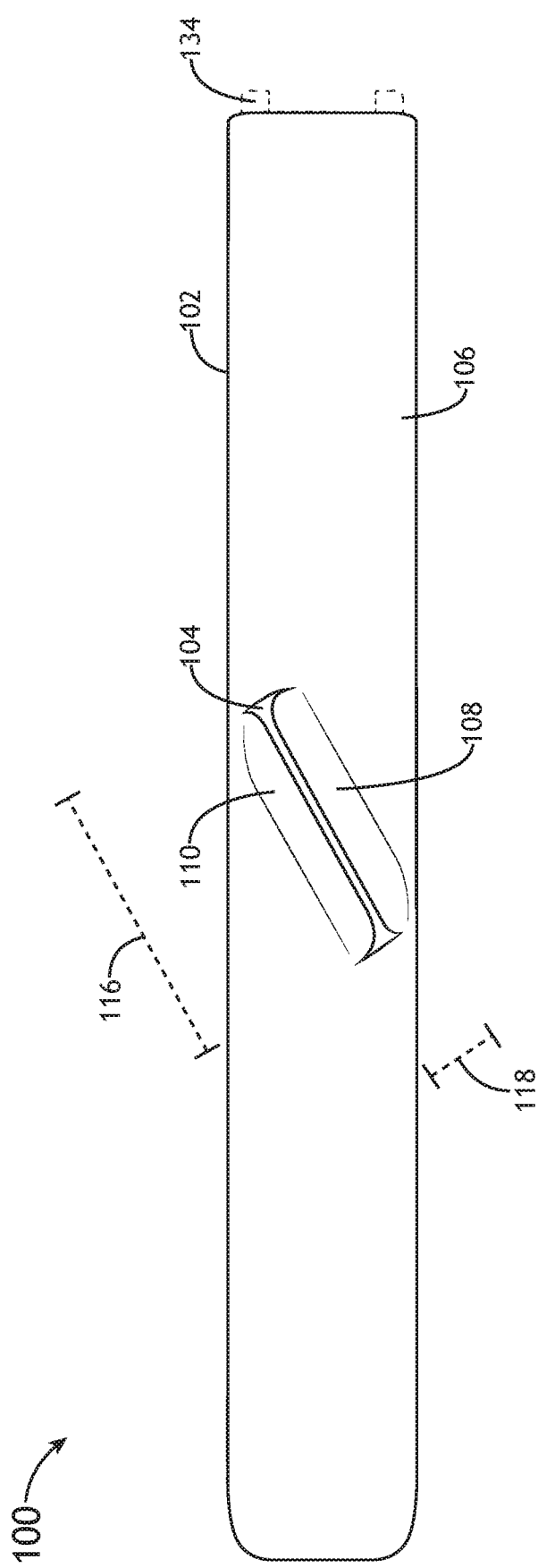
FIG. 2B is a top plan view of a contoured armcap for multi-seat occupant usage, in accordance with one or more embodiments of the disclosure.
Figure 2C:
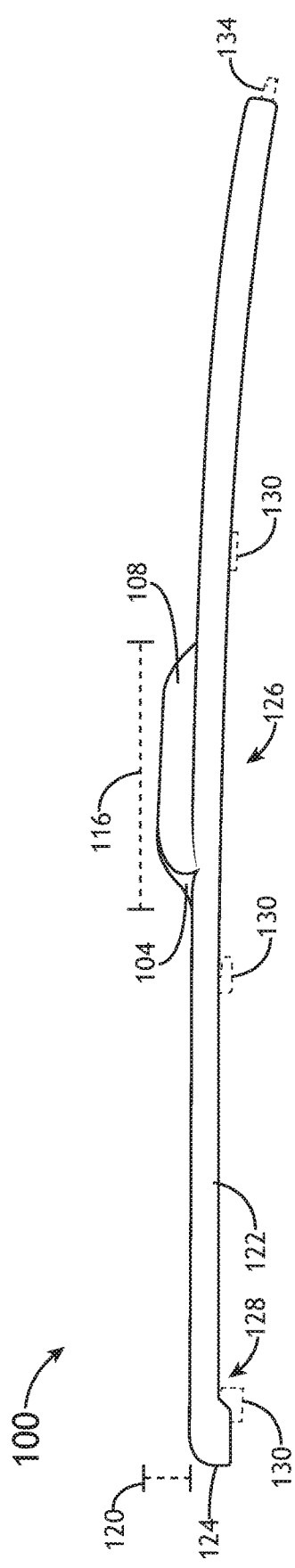
FIG. 2C is a left elevation view of a contoured armcap for multi-seat occupant usage, in accordance with one or more embodiments of the disclosure.
Figure 2D:
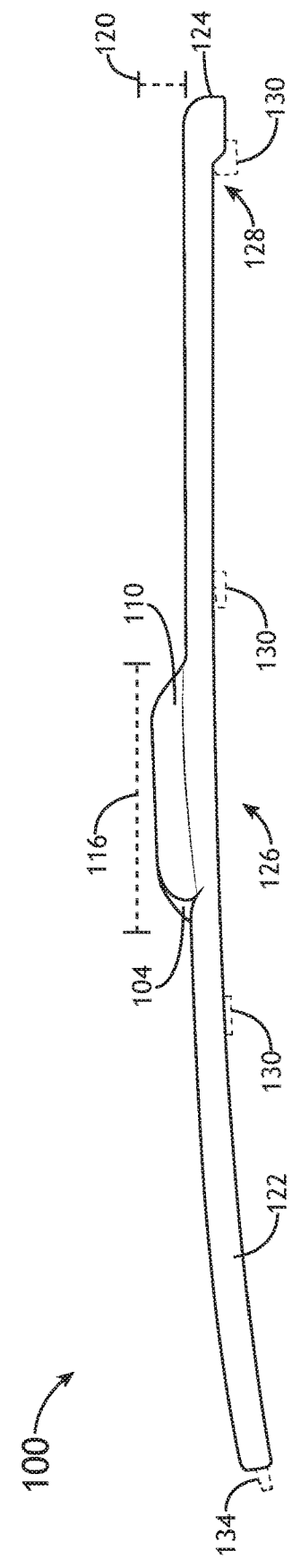
FIG. 2D is a right elevation view of a contoured armcap for multi-seat occupant usage, in accordance with one or more embodiments of the disclosure.
Figure 2G:
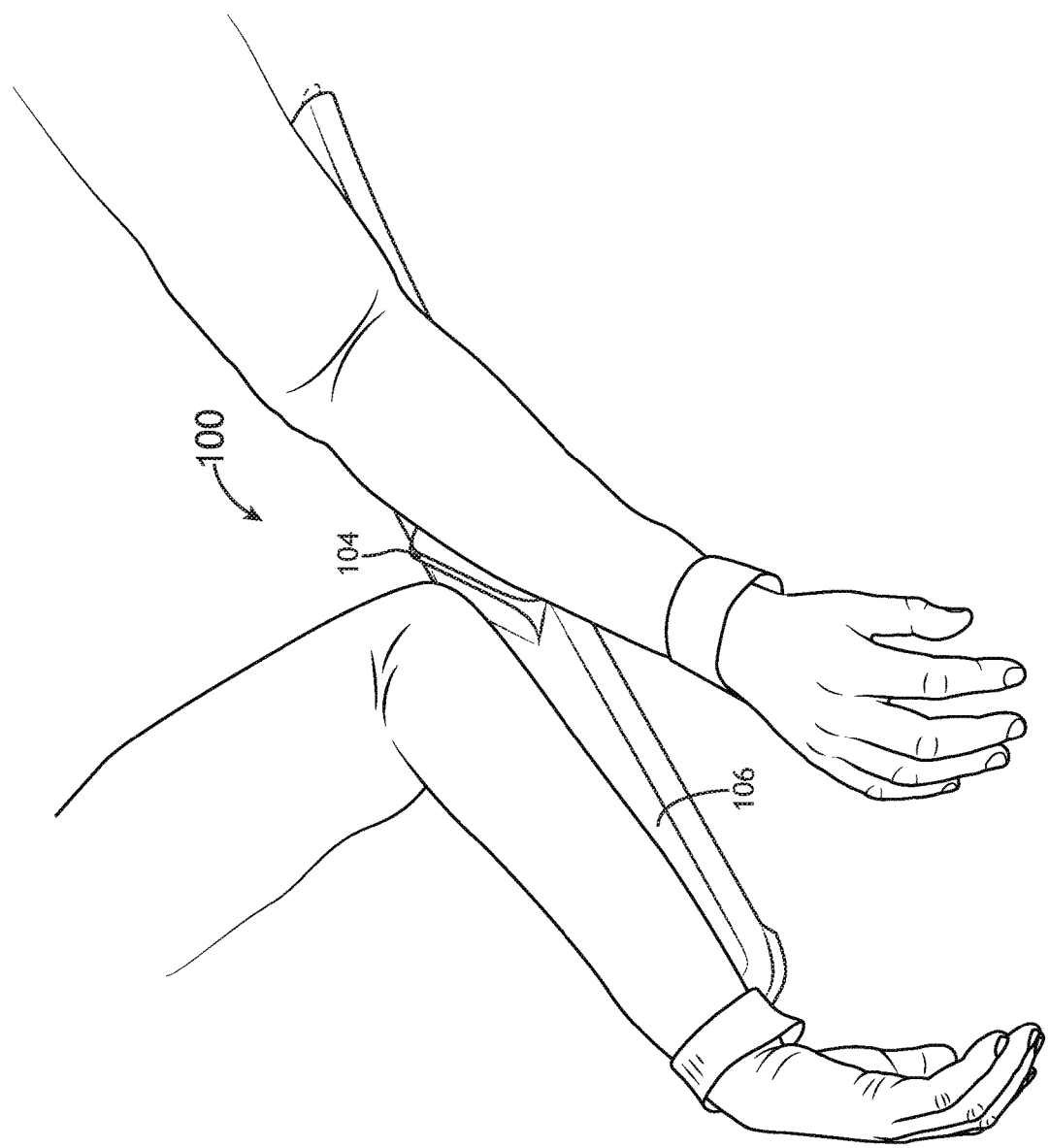
FIG. 2G is a perspective view of a contoured armcap for multi-seat occupant usage in use, in accordance with one or more embodiments of the disclosure.

The side 108 and/or the side 110 of the raised edge or surface 104 may be configured to trace a defining contour line on the top surface 102. As illustrated in FIGS. 1A-1G, the contour line may be an S-curve having at least two sections (e.g., sections 112, 114), where the break of the S-curve may be moved forward and backward along a length of the top surface 102 (e.g., depending on a length of the armcap 100 or a length of a portion of an arm of a seat occupant occupying an aircraft seat coupled to the shared armrest). For example, each section 112, 114 may be shaped to conform with a portion of a forearm of a seat occupant using the armcap 100. For instance, as illustrated in FIG. 1G, the raised edge or surface 104 may provide an intuitive guide to seat occupants sharing the armcap 100 about which seat occupant gets which portion of the armcap 100 (e.g., which area 106 of the top surface 102). As illustrated in FIGS. 2A-2G, the contour line may be a diagonal line, where the diagonal line is set an angle from a long edge of the top surface 102. For instance, as illustrated in FIG. 2G, the raised edge or surface 104 may provide an intuitive guide to seat occupants sharing the armcap 100 about which seat occupant gets which portion of the armcap 100 (e.g., which area 106 of the top surface 102).

It is noted herein that the contour line may define a straight line that runs substantially parallel with a long edge of the top surface of the armcap 100. In addition, it is noted herein that the contour line may define a raised edge or surface 104 including one or more straight, diagonals, and/or curved sections.

The raised edge or surface 104 may have a select length 116. As illustrated in FIGS. 1A-1G, the length 116 may be approximately equal to a length of the top surface 102 (e.g., is a full-length raised edge 104). As illustrated in FIGS. 2A-2G, the length 116 may be equal to a portion of the length of the top surface 102 (e.g., is a partial-length raised edge 104).

The raised edge or surface 104 may have a select width 118. As illustrated in FIGS. 1A-1G, the width 118 may vary along the length 116 of the raised edge or surface 104. For example, the width 118 may be narrower depending on where the contour line defines the raised edge or surface 104 on the top surface 102 (e.g., proximate to an edge of the top surface 102), to conform with a portion of a forearm of a seat occupant using the armcap 100, and/or to reduce manufacturing costs. As illustrated in FIGS. 2A-2G, the width 118 may be constant along the length 116 of the raised edge or surface 104.

The raised edge or surface 104 may be offset from the top surface 102 at a select height 120. As illustrated in FIGS. 1A-1G, the height 120 may vary along the length 116 of the raised edge or surface 104. For example, the height 120 may be shorter at a front edge and/or a rear edge of the armcap 100, such that there is a peak in a central section (e.g., near the break of a defined S-curve contour line) of the raised edge or surface 104. For instance, the varied height 120 may increase safety (e.g., to reduce the possibility of a lead corner resulting in injury to a seat occupant when sliding past the armcap 100 in a down position) and/or may reduce manufacturing costs. As illustrated in FIGS. 2A-2G, the height 120 may be constant along the length 116 of the raised edge or surface 104.

The armcap 100 may include a one or more side surfaces 122. The top surface 102 and the one or more side surfaces 122 may be connected by a fillet, a chamfer, or a corner. For example, a fillet or chamfer may reduce the possibility of a lead corner resulting in injury to a seat occupant when sliding past the armcap 100 in a down position and/or may reduce manufacturing costs.

The armcap 100 may include a front surface 124. The top surface 102 and the front surface 124 may be connected by a fillet, a chamfer, or a corner. The top surface 102 and the one or more front surfaces 124 may be connected by a fillet, a chamfer, or a corner. For example, a fillet or chamfer may reduce the possibility of a lead corner resulting in injury to a seat occupant when sliding past the armcap 100 in a down position and/or may reduce manufacturing costs.

The armcap 100 may include a bottom surface 126. The one or more side surfaces 122 may be greater in height proximate to the front surface 124, such that the bottom surface 126 may include a notch 128 proximate to the front surface 124. For example, the one or more side surfaces 122 being greater in height proximate to the front surface 124 may reduce the possibility of an exposed edge of an armrest (e.g., an armrest 404, as illustrated in FIG. 4), which may result in injury to a seat occupant when sliding past the armcap 100 in a down position). It is noted herein, however that the one or more side surfaces 122 may be the same height for the length of the armcap 100, such that the bottom surface 126 may not include a notch 128. The bottom surface 126 and/or the notch 128 may include one or more dimensions configured to conform to one or more surfaces of the armrest (e.g., a top surface of the armrest).

The bottom surface 126 may include one or more bottom couplers 130. The armcap 100 may be configured to couple to the armrest (e.g., an armrest 404, as illustrated in FIG. 4) via the one or more bottom couplers 130. For example, the one or more bottom couplers 130 may be configured to receive a set of fasteners, an adhesive, or the like to couple the armcap 100 to the armrest. The armcap 100 may be aligned with the armrest in a certain position via the one or more bottom couplers 130. For example, the one or more bottom couplers 130 may fit within holes in a top surface.

The armcap 100 may include a rear surface 132. The rear surface 132 may include one or more rear couplers 134. The armcap 100 may be configured to couple to the armrest (e.g., an armrest 404, as illustrated in FIG. 4) via the one or more rear couplers 134. For example, the one or more rear couplers 134 may be configured to receive a set of fasteners, an adhesive, or the like to couple the armcap 100 to the armrest. The armcap 100 may be aligned with the armrest in a certain position via the one or more rear couplers 134. For example, the one or more rear couplers 134 may fit within holes in a rear surface of the armrest along the length of the top surface of an armrest. The rear surface 132 may include one or more dimensions configured to conform to one or more surfaces of the armrest. It is noted herein the rear surface 132 may be considered a side surface 122 in some embodiments.

FIGS. 3A-3G generally illustrate the contoured armcap 300 for multi-seat occupant usage, in accordance with one or more embodiments of the disclosure.

The armcap 300 may include a raised surface 302 positioned above the top surface 102. The raised surface 302 may separate the top surface 102 into two areas. For example, the armcap 300 may include an area represented by the raised surface 302 and an area represented by the remainder of the top surface 102 (e.g., an area 106). Each area may be configured to support a portion of a forearm of a seat occupant using the armcap 300.

The raised surface 302 may be offset from the top surface 102 at a select height 120. The height 120 may be constant for the entire raised surface 302. It is noted herein, however, that the height 120 may vary along a length or width of the raised surface 302. For example, the height 120 may be shorter at a front edge and/or a rear edge of the raised surface 302, such that there is a peak in a central section of the raised surface 302. For instance, the varied height 120 may increase safety (e.g., to reduce the possibility of a lead corner resulting in injury to a seat occupant when sliding past the armcap 300 in a down position) and/or may reduce manufacturing costs.

The raised surface 302 may be continuously coupled to the top surface 102 via a set of one or more sides. For example, the armcap 300 may have a side 304. The side 304 may include a concave fillet section that may conform with a portion of a forearm of a seat occupant using the armcap 300. It is noted herein however, that the side 304 may include a mitre fillet or a convex fillet. In addition, it is noted herein the side 304 may include any combination of concave fillets, mitre fillets, and/or convex fillets. It is noted herein that "continuously" is being used to indicate there is no empty space or gap between the top surface 102 and the raised surface 302, in which a seat occupant may insert a possession (e.g., a personal electronic device, a power cable, or the like), a portion of their body (e.g., a finger or thumb, wrist, arm, or the like), trash, a seatbelt component, or the like.

Figure 3A:
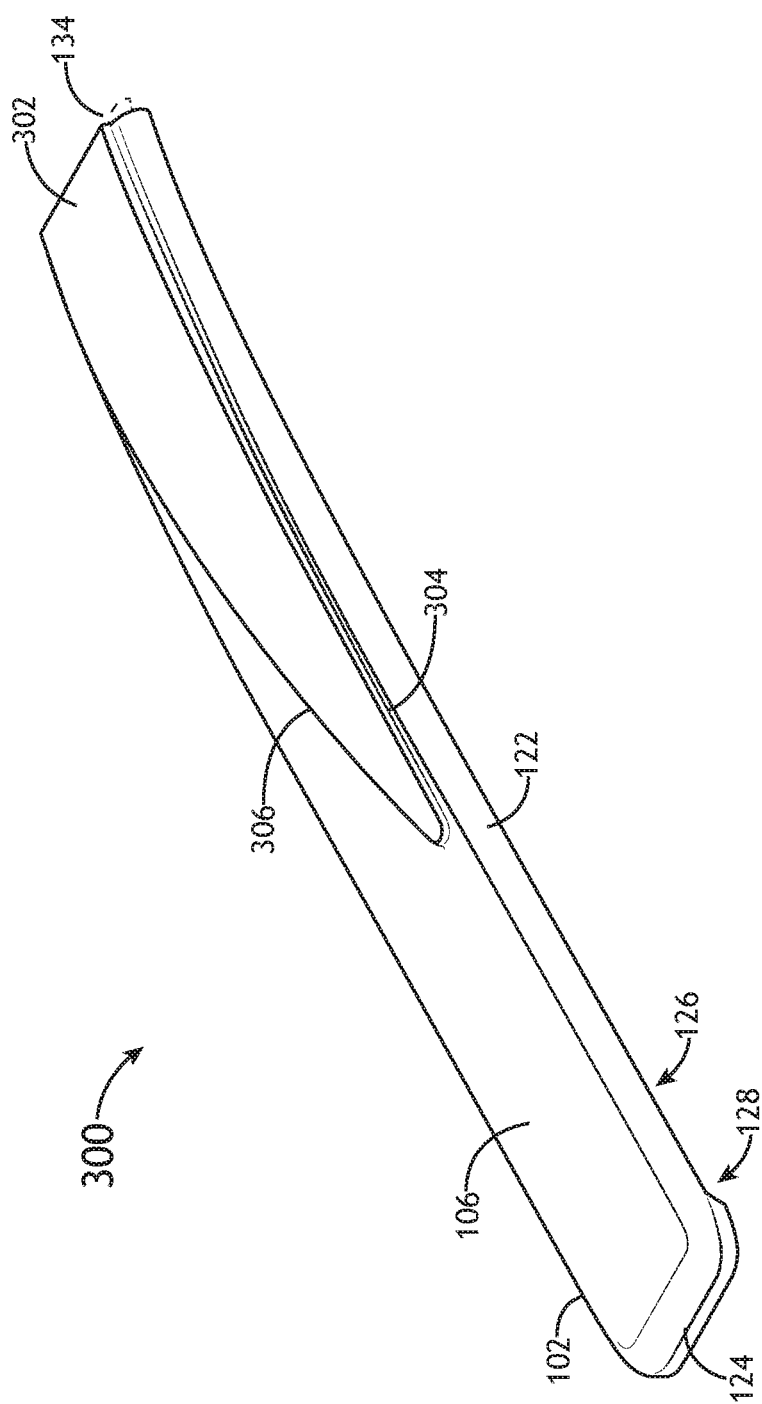
FIG. 3A is a perspective view of a contoured armcap for multi-seat occupant usage, in accordance with one or more embodiments of the disclosure.
Figure 3B:
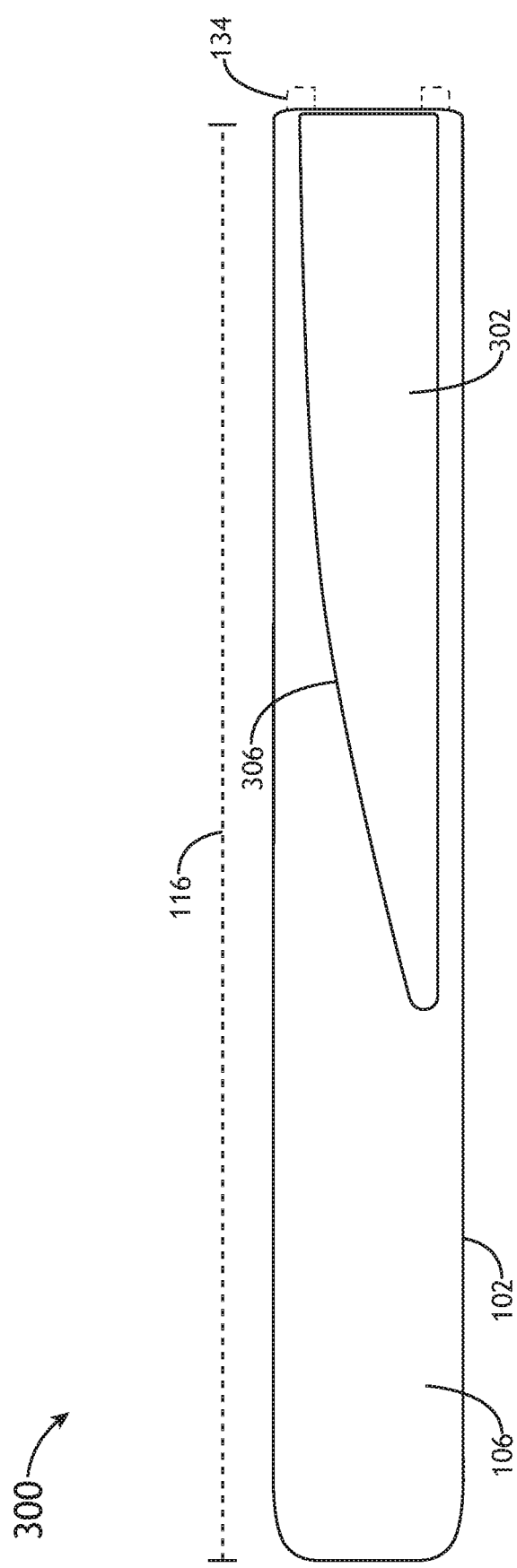
FIG. 3B is a top plan view of a contoured armcap for multi-seat occupant usage, in accordance with one or more embodiments of the disclosure.
Figure 3C:
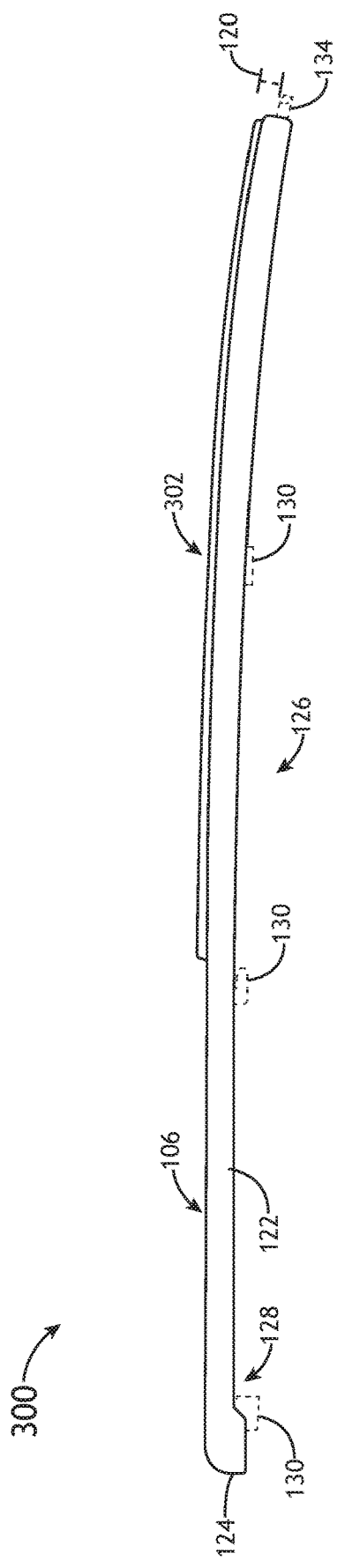
FIG. 3C is a left elevation view of a contoured armcap for multi-seat occupant usage, in accordance with one or more embodiments of the disclosure.
Figure 3D:
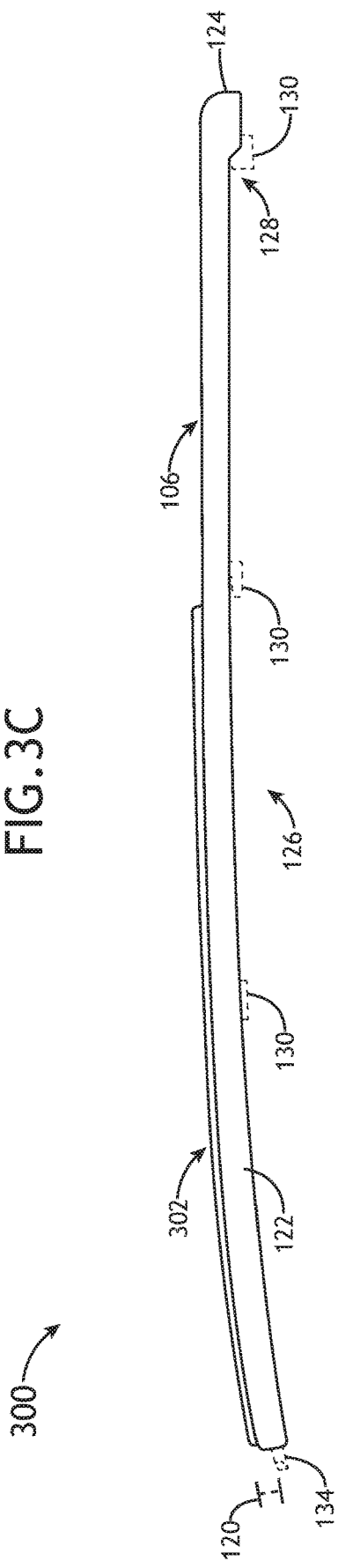
FIG. 3D is a right elevation view of a contoured armcap for multi-seat occupant usage, in accordance with one or more embodiments of the disclosure.
Figure 3E:
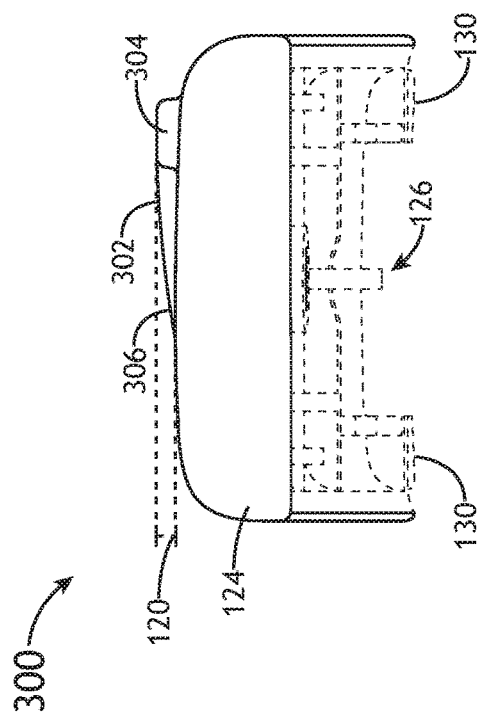
FIG. 3E is a front elevation view of a contoured armcap for multi-seat occupant usage, in accordance with one or more embodiments of the disclosure.
Figure 3F:
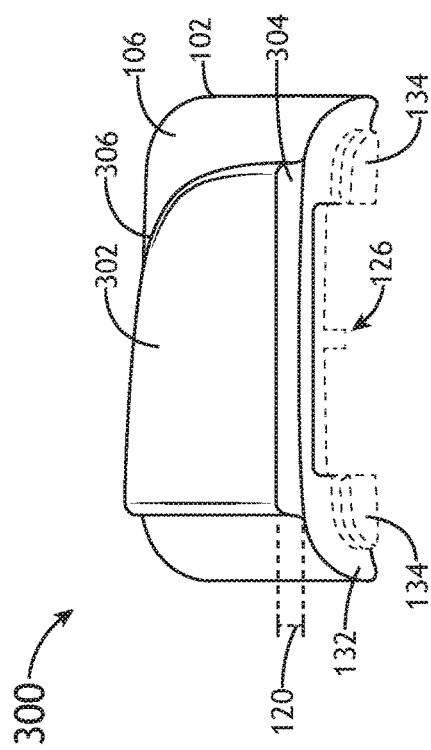
FIG. 3F is a rear elevation view of a contoured armcap for multi-seat occupant usage, in accordance with one or more embodiments of the disclosure.
Figure 3G:
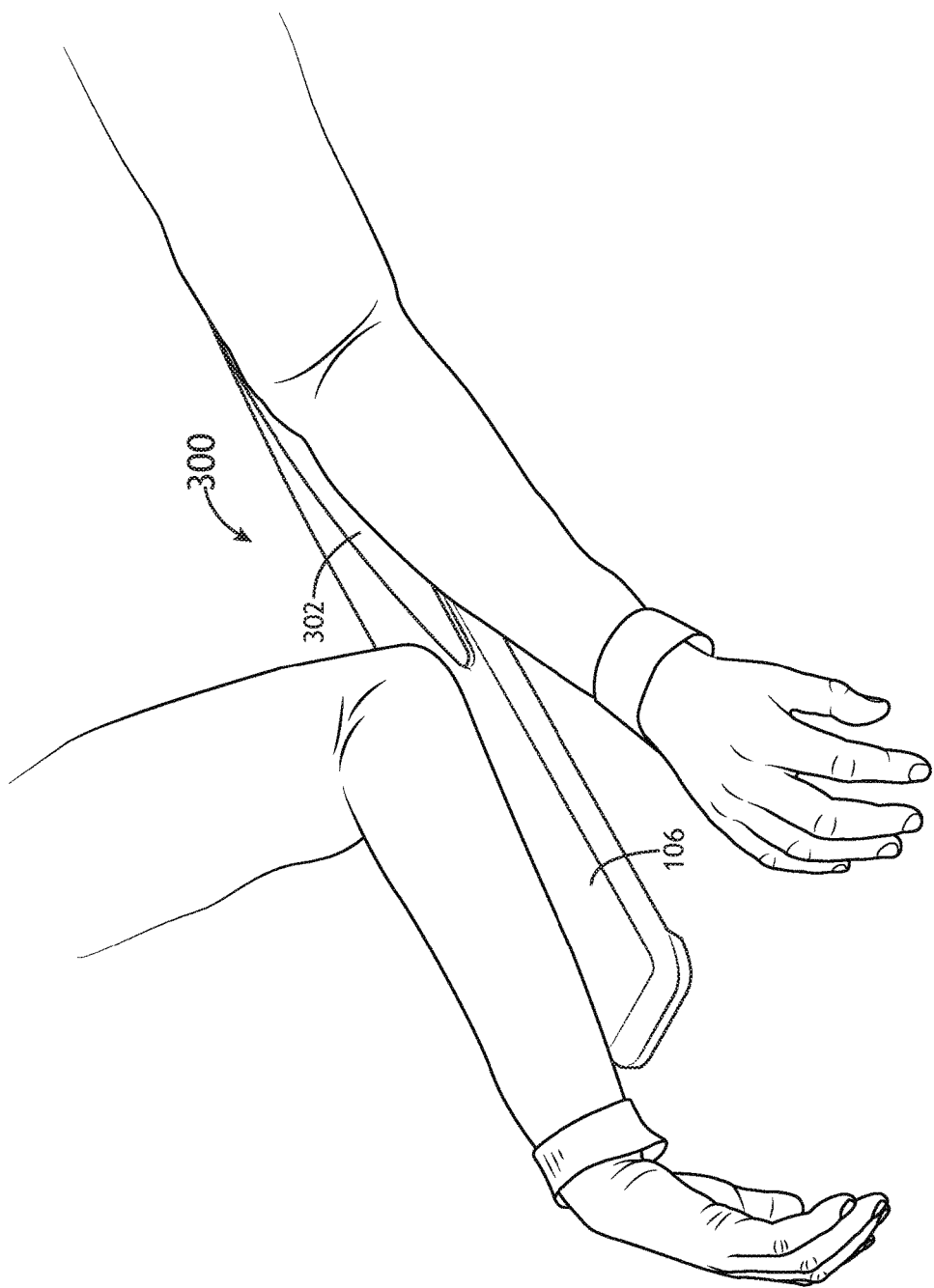
FIG. 3G is a perspective view of a contoured armcap for multi-seat occupant usage in use, in accordance with one or more embodiments of the disclosure.

The side 304 may have a contoured edge 306. The contoured edge 306 may be configured to trace a defining contour line on the top surface 102. The contoured edge 306 may conform with a portion of a forearm of a seat occupant using the armcap 300. As illustrated in FIG. 3G, the contoured edge 306 may provide an intuitive guide to seat occupants sharing the armcap 300 about which seat occupant gets which portion of the armcap 300 (e.g., the raised surface 302 versus the remainder of the top surface 102). It is noted herein, however, that the height difference between the top surface 102 and the raised surface 302 may be small enough that a single seat occupant could use the entire length of the armcap 100 without discomfort.

Although embodiments of the present disclosure are directed to the armcaps 100, 300 including one or more raised dividers (e.g., the raised surface or edge 104, the raised surface 302, or the like), it is noted herein that the top surface 102 may instead include a recessed divider. For example, the recessed divider may include, but is not limited to, a straight recessed line, a diagonal recessed line, a recessed S-curve line, a recessed surface, or other divider configured to provide an intuitive guide to seat occupants sharing the armcaps 100, 300 about which seat occupant gets which portion of the armcaps 100, 300 (e.g., which area of the top surface 102, the recessed surface versus the remaining area of the top surface 102, or the like). Therefore, the above description should not be interpreted as a limitation on the scope of the present disclosure but merely an illustration.

Although embodiments of the present disclosure are directed to the armcaps 100, 300 including the one or more bottom couplers 130 and/or the one or more rear couplers 134, it should be understood that these may not form part of the claimed invention or design but rather is only a portion of an environment in which the claimed invention or design operates. For example, the armcaps 100, 300 may be formed with the armrest as a single component (e.g., as illustrated in FIG. 4B), such that the one or more bottom couplers 130 and/or the one or more rear couplers 134 are not required. Therefore, the above description should not be interpreted as a limitation on the scope of the present disclosure but merely an illustration.

FIGS. 4A and 4B illustrates a vehicle 400 including a seat 402 with one or more contoured armcaps 100 for multi-seat occupant usage, in accordance with one or more embodiments of the disclosure.

Where the vehicle 400 is a seat occupant aircraft 400, the armcaps 100, 300 may be installed and/or configured or dimensioned to fit on an armrest 404 of the seat 402 of the seat occupant aircraft 400. Here, the armcap 100 may be configured to not interfere with the operation of the seat 402 (e.g., the operation of a switch within the armrest 404, where the switch is configured to recline the seat 400).

It is noted herein, however, that the armcaps 100, 300 may instead may be installed and/or configured or dimensioned to fit on any seat of any type of vehicle known in the art that has adjacent seats which share an armrest. For example, the vehicle may be any air, land, or water-based personal equipment or vehicle; any air, land, or water-based commercial equipment or vehicle; any air, land, or water-based military equipment or vehicle known in the art.

In addition, it is noted herein the armcaps 100, 300 may be installed and/or configured or dimensioned to fit on any seat within a home or a business. For example, the armcaps 100, 300 may be installed and/or configured or dimensioned to fit on a seat in auditoriums, movie theatres, sports venues (e.g., baseball parks, arenas, or other venues having installed seats, or the like), where adjacent seats share an armrest. Therefore, the above description should not be interpreted as a limitation on the disclosure but merely an illustration.

The armcaps 100, 300 may be fabricated from a plastic (e.g., via an injection molding process, or the like) or a metal (e.g., via a stamping, a casting, or a machining process). The fabricated armcaps 100, 300 may be covered (e.g., overmolded) with a material (e.g., rubber, foam, cloth, leather, or the like) configured to soften any fabricated edges of the armcap 100.

Referring now to FIG. 4A, the armcaps 100, 300 may then be coupled to an armrest. The seat 402 may include two armrests, where a first armrest 404 includes an armcap 100, 300 (e.g., as illustrated in FIGS. 1A-1G, 2A-2G, and 3A-3G) and a second armrest 404a includes a mirrored armcap 100a, 300a, where the mirrored armcap 100a, 300a includes a raised surface that mirrors the divider (e.g., raised edge or surface 104, raised surface 302, recessed line or surface, or the like) of the armcap 100, 300. For instance, the armcap 100, 300 and the mirrored armcap 100a, 300a may be mirrored through a plane defined by a side surface 122 of the armcap 100, 300.

It is noted herein that installing the armcap 100, 300 and the mirrored armcap 100a, 300a may be necessary for purposes of providing a seat occupant an intuitive guide about which portion of the armcap 100 (e.g., which portion of the top surface 102, the second recessed surface versus the remainder of the top surface 102, or the like) the seat occupant may use. In addition, it is noted herein, however, that the same armcap 100 may be used to reduce manufacturing costs (e.g., reduce the need for re-tooling, or the like).

Referring now to FIG. 4B, the armcap 100 and an armrest 404 may be fabricated (e.g., cast, stamped, molded, or the like) as a single component, or an armrest and armcap component 406. The seat 402 may include two armrest and armcap components, where an armrest and armcap component 406 includes an armcap design (e.g., the raised surface or edge 104 as illustrated in FIGS. 1A-1G, 2A-2G, the raised surface 302 as illustrated in FIGS. 3A-3G, or the like) and a mirrored armrest and armcap component 406a includes a mirrored armcap design, where the mirrored armcap design includes a raised surface that mirrors the divider (e.g., raised edge or surface 104, raised surface 302, recessed line or surface, or the like) of the armcap 100a. For instance, the armrest and armcap component 406 and the mirrored armrest and armcap component 406a may be mirrored through a plane defined by a side surface 122.

It is noted herein that installing the armrest and armcap component 406 and the mirrored armrest and armcap component 406 may be necessary for purposes of providing a seat occupant an intuitive guide about which portion of the armcap 100 (e.g., which portion of the top surface 102, the second recessed surface versus the remainder of the top surface 102, or the like) the seat occupant may use. In addition, it is noted herein, however, that the same armrest and armcap component 406 may be used to reduce manufacturing costs (e.g., reduce the need for re-tooling, or the like).

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A contoured armcap for multi-seat occupant usage, comprising:
    a top surface;
    a bottom surface including one or more dimensions configured to conform to a surface of a shared armrest;
    one or more side surfaces, the one or more side surfaces being configured to connect the top surface and the bottom surface; and
    a raised surface configured to separate the top surface into two areas, the raised surface offset from the top surface at a plurality of select heights, the raised surface continuously coupled to the top surface via a set of sides, at least one side of the set of sides being defined by a contour line,
    the two areas including a first area configured to support a portion of an arm of a first seat occupant in a first aircraft seat coupled to the shared armrest including the contoured armcap,
    the two areas including a second area configured to support a portion of an arm of a second seat occupant in a second aircraft seat coupled to the shared armrest including the contoured armcap.

2. The contoured armcap of claim 1, the contour line being an S-curve.

3. The contoured armcap of claim 1, the contour line being a diagonal line.

4. The contoured armcap of claim 1, the plurality of select heights being varied along a length of the contoured armcap.

5. The contoured armcap of claim 4, the plurality of select heights having a peak in a central portion of the raised surface.

6. The contoured armcap of claim 1, the raised surface being offset from the two areas at the select height.

7. The contoured armcap of claim 1, the raised surface being an area of the two areas, the raised surface configured to support a portion of an arm of a particular seat occupant.

8. The contoured armcap of claim 1, the bottom surface including one or more bottom couplers, the contoured armcap being configured to couple to the shared armrest via the one or more bottom couplers.

9. The contoured armcap of claim 1, the second aircraft seat being coupled to the shared armrest and a second shared armrest, the second shared armrest including a second contoured armcap with a second raised surface mirrored through a plane defined by a side surface of the one or more side surfaces.

10. The contoured armcap of claim 1, further comprising:
    a rear surface including one or more dimensions configured to conform to a surface of the shared armrest,
    the rear surface being configured to connect the top surface and the bottom surface.

11. The contoured armcap of claim 10, the rear surface including one or more rear couplers, the contoured armcap being configured to couple to the shared armrest via the one or more rear couplers.

12. The contoured armcap of claim 1, the contoured armcap and the shared armrest being fabricated as a single component.

13. A contoured armcap for multi-seat occupant usage, comprising:
    a top surface;
    a bottom surface including one or more dimensions configured to conform to a surface of a shared armrest;
    one or more side surfaces, the one or more side surfaces being configured to connect the top surface and the bottom surface; and
    a divider configured to separate the top surface into two areas, the divider offset from the top surface at a select height, the divider continuously coupled to the top surface via a set of sides, at least one side of the set of sides being defined by a contour line, the two areas including a first area configured to support a portion of an arm of a first seat occupant in a first aircraft seat coupled to the shared armrest including the contoured armcap, the two areas including a second area configured to support a portion of an arm of a second seat occupant in a second aircraft seat coupled to the shared armrest including the contoured armcap.

14. The contoured armcap of claim 13, the divider including a raised surface.

* * * * *